United States Patent [19]

Kubota et al.

[11] 4,301,440

[45] Nov. 17, 1981

[54] LEVEL DETECTING DEVICE

[75] Inventors: Hitoshi Kubota, Fujisawa; Yoshihiro Hayashida, Chigasaki; Hironori Kutsuma, Kawasaki, all of Japan

[73] Assignees: Nissan Motor Co., Ltd., Yokohama; Tokico Ltd., Kawasaki, both of Japan

[21] Appl. No.: 96,200

[22] Filed: Nov. 20, 1979

[30] Foreign Application Priority Data

Dec. 5, 1978 [JP] Japan ............................... 53/150919

[51] Int. Cl.³ .......................................... H01H 35/18
[52] U.S. Cl. .................................... 340/59; 335/205; 200/84 C
[58] Field of Search ............... 340/52 C, 59, 612, 618, 340/623, 624; 73/307, 308, 313, 319; 200/61.2, 51 R, 84 R, 84 C; 335/205; 339/31 R, 185 R; 285/81, 91; 220/293-301

[56] References Cited

U.S. PATENT DOCUMENTS

| 3,293,579 | 12/1966 | Harper | 200/84 C |
| 3,320,573 | 5/1967 | Machts | 339/31 R |
| 3,750,124 | 7/1973 | Barnes | 200/84 C |
| 3,947,813 | 3/1976 | Vemura | 200/84 C |
| 3,995,889 | 12/1976 | Carr | 285/91 |
| 4,133,560 | 1/1979 | Ishikawa | 220/293 |

FOREIGN PATENT DOCUMENTS 1358411  7/1974  United Kingdom ............. 200/84 C

*Primary Examiner*—Gerald P. Tolin

[57] ABSTRACT

The level detecting device comprises a detector inserted in a reservoir to detect the level of oil liquid, lead wires leading signal from the detector, and a terminal connected to the lead wires. The terminal is fixed to a cap covering an opening of the reservoir and the cap is removably engaged to a cylindrical projection arranged around the opening of the reservoir.

10 Claims, 7 Drawing Figures

LEVEL DETECTING DEVICE

The present invention relates to a level detecting device mounted on a reservoir for a vehicle, such as automobile.

A brake system for a vehicle is equipped with a master cylinder and a reservoir which supplies said master cylinder with oil liquid, and said reservoir is provided with a level detecting means, which is adapted to signal decrease in quantity of oil liquid in said reservoir lower than a predetermined level. Signal thus sent from said level detecting means is transmitted to an alarm means as actuating signal. In conventional level detecting means, detectors for liquid level are positioned in reservoirs and signals from said detectors are delivered out of said reservoirs through lead wires. Then the connectors located at ends of said lead wires being generally free and fixed to nothing, in such cases as assembling, maintenance, repairing, etc., connection of the lead wires to an alarming device is necessary to be carried out with both hands. This operation is difficult and lead wires are liable to be pulled forcibly with result of damage, etc.

An object of the present invention is to provide a level detecting device adapted to fix ends of lead wires from a detector.

Another object of the present invention is to provide a level detecting device in which connection of lead wires during assembling, maintenance, and repairing can be operated simply and connectors can be connected easily with one hand.

A further object of the present invention is to provide a level detecting device in which lead wires are not possibly pulled forcibly, accordingly occurance of accidents such as cutting, break, etc. can be decreased.

Still another object of the present invention is to provide a small and compact level detecting device which is applicable to a reservoir placed in, for example, a narrow engine room or the like without influencing other elements.

According to the present invention, a level detecting device comprises a detector positioned in a reservoir having an opening for detecting level of oil liquid in the reservoir and a cap engaged to the reservoir for covering said opening and having a terminal connected to lead wires from the detector.

Now preferred embodiments of the present invention are described referring to attached drawings, therein above-mentioned objects and features as well as other objects and features will become clearer.

Figure 1:
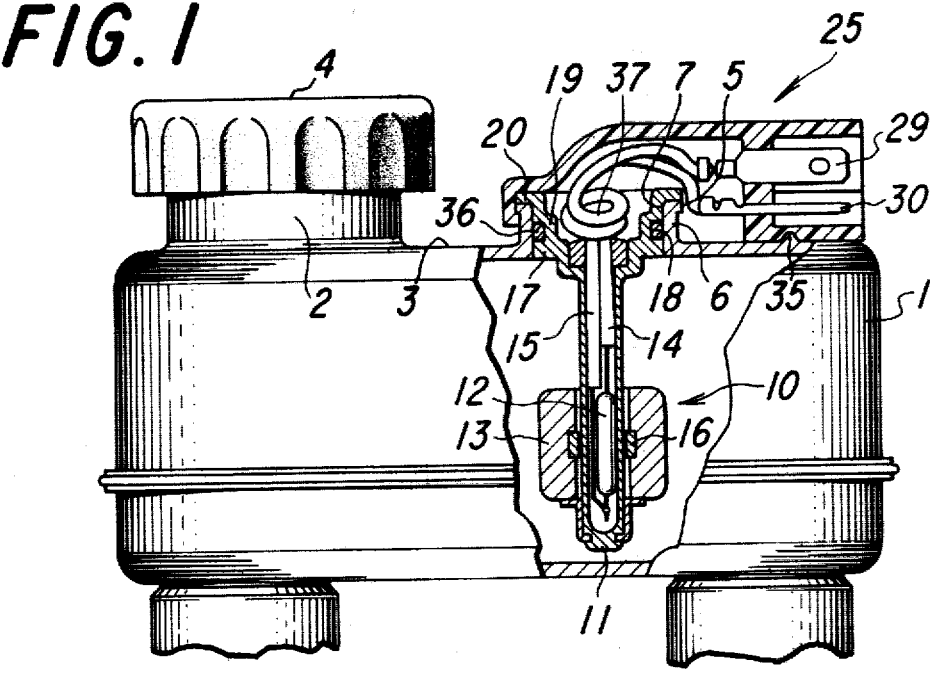
FIG. 1 is a partially sectional front view of a reservoir fitted with a level detecting device of the preferred embodiment of the present invention.

As shown in FIG. 1, the reservoir 1 used for the brake system of a vehicle has substantially rectangular horizontal cross-section and is adapted to be applied to well-known tandem master cylinders in itself. Upward from the ceiling portion 3 adjacent to one longitudinal end of said reservoir 1, a cylindrical portion 2 is projected to define a feeding inlet for oil fluid by the inside of said cylindrical portion 2, said feeding inlet being normally covered by a cap 4.

At substantially central part of the ceiling portion 3 of the reservoir 1 a cylindrical portion 6 having a flange 5 is projected upward, the inside of said cylindrical portion 6 forming an opening 7 to which a level detecting means 10 is fitted.

Said level detecting means 10 comprises a cylindrical case member 11 a lower end of which is formed fluid; a reed relay 12 fixed to the inside of said case 11 by means of epoxy resin and the like; a float 13 positioned outside said case 11 movable up and down along said case 11; and lead wires 14, 15 connected to said reed relay 12, wherein said lead wires 14, 15 are taken out through said case 11. Said float 13 containing a magnet 16, when liquid level descents to a predetermined level, said magnet 16 actuates said reed relay 12 to send signal. Thus float 13 and reed relay 12 act as a detector to detect the level of oil liquid in the reservoir 1. Said signal from the reed relay 12 is delivered outside through lead wire 14, 15.

The upper end of said case 11 is formed into a large diameter portion 17, from which an annular portion 19 is projected upward to define a sealing space 18, the upper end of said annular portion 19 extending radially outward to form a flange 20, which is in contact with the flange 5 of said cylindrical portion 6 projecting from the ceiling portion 3 of said reservoir 1.

Figure 2:
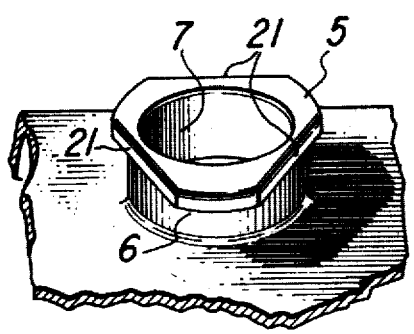
FIG. 2 is a diagonal view of a flange for the reservoir shown in FIG. 1.

As shown in FIG. 2, said flange 5 of the cylindrical portion 6 is cut out by three planes to shape three cut-off portions 21, and said flange 20 of the case member 11, which is projecting radially outward from the cylindrical portion 6 and in contact with said flange 5, is also formed into a similar shape. The number of cut-off portions 21 may be not limited to three as shown in this embodiment, but may be any more than two.

Figure 3:
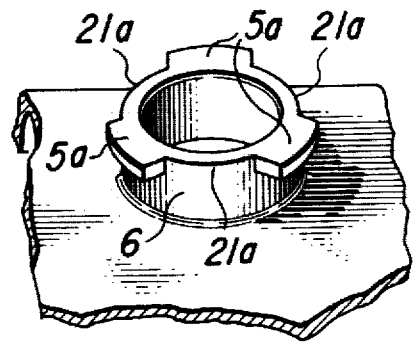
FIG. 3 is a diagonal view of another embodiment of a flange for the reservoir shown in FIG. 1.

Otherwise, as shown in FIG. 3, the flange 5a may be formed by providing three cut-off portions 21a by cutting out the circular flange along circumferential surface of the cylindrical portion 6, and the flange 20 of the case 11 being in contact with the flange 5a may be shaped to fit the flange 5a.

Figure 4:
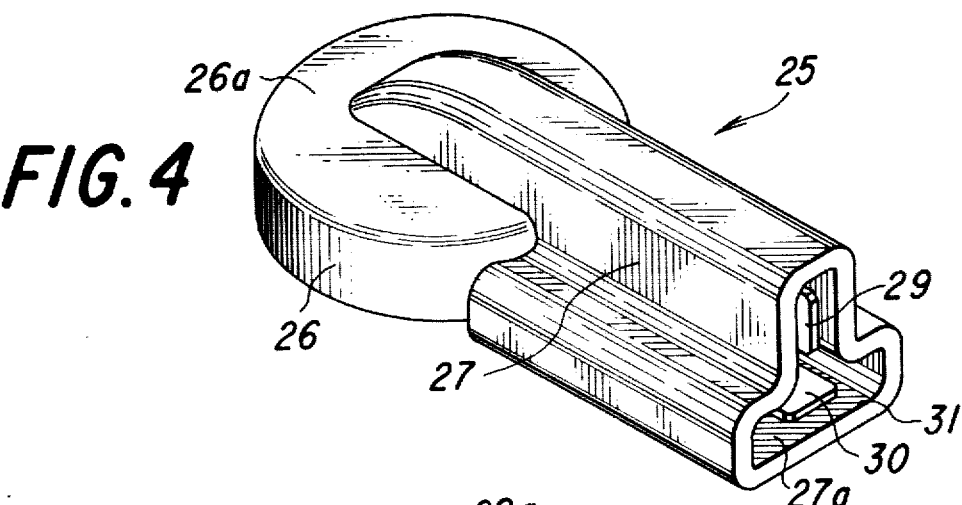
FIG. 4 is a downward diagonal view of a cap for the level detecting device shown in FIG. 1.
Figure 5:
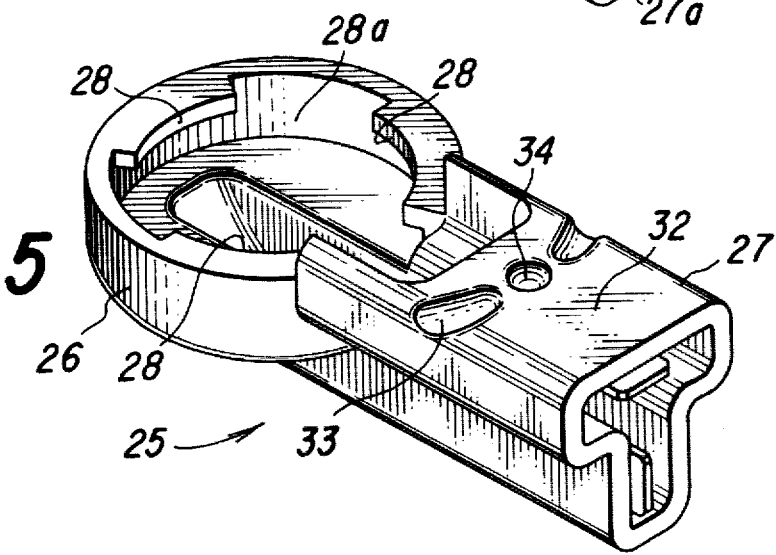
FIG. 5 is an upward diagonal view of the cap shown in FIG. 4.

The cap 25 is engaged to said flange 5 to cover opening 7, and, as shown in FIG. 4 and FIG. 5, comprises a cylindrical body 26 having a little larger diameter than that of the circular flange 5 before cut-off portions 21 are formed, and a terminal covering portion 27 integrally projecting laterally from said cylindrical body 26, which has same number of pawls 28 as cut-off portions 21 projecting radially inward from the inner edge of said cylindrical body 26 and having shape fitted to said cut-off protions 21 at the corresponding postion to said cut-off portions 21. These pawls 28 are adapted to be in contact with the upper face of the flange 20 of said case 11 at the inner face of the ceiling portion 26a of said cylindrical body 26, and are formed to have the height to be in contact with the lower face of the flange 5 of said cylindrical portion 6 at the upper face of said pawls 28, 25 is fitted to the reservoir 1 as shown in FIG. 1. In this case, it is preferable that each contact faces are adapted to have such height as engaged with slight friction to improve sealability as well as to prevent the cap from disengagement.

A covering portion 27 is formed to have inverted T shape in the space 27a enveloped by said covering portion 27 in the vertical section, said space 27a communicated with the inner space 28a of said cylindrical body 26 through holes, and the terminals 29, 30 connected to lead wires 14, 15 being arranged to be positioned vertically and horizontally respectively, that is, perpendicular each other at their broad faces and being fixed to said covering portion 27 at the holes to form connector 31. A guide groove 33 and a recess 34 at the center are provided on the lower face 32 of the covering portion 27, on the other hand, a projection 35 is provided at the transverse center on the ceiling portion 3 of the reservoir 1 at the corresponding position to said guide groove 33 and recess 34. After fitting the pawls 28 of the cap to the cut-off portions 21 of the flange the cap 25 is pushed and the pawls 28 is placed lower than the flange 5, and by rotating the cap 25 the projection 35 is engaged to the guide groove 33. In this case, the guide groove 33 is formed to be deeper at the entrance than at the central part and becomes gradually shallower from the entrance toward the central part, and the projection 35 is formed to be disengaged from the guide groove due to elastic deformation, when the projection 35 is relatively moved from the guide groove to the recess 34, and afterward to be engaged to the recess 34. Thus formed, resistance against rotation of the cap 25 is little, and further rotation of the cap 25 is prevented after the recess 34 is engaged to the projection 35, and in employing the cap is not disengaged from the reservoir by rotation due to vibration.

On mounting the level detecting means constructed as above description to a reservoir, the reed relay 12 and lead wires 14, 15 are previously inserted into the case member 11 and encapsulated with epoxy resin. In this case, it is preferable that the lead wires form spiral portions 37 to have allowance to keep the cap 25 and the case 11 apart at a certain distance. After fitting an elastic sealing member such as O-ring 36 into the sealing space 18, the case member 11 is inserted into the reservoir 1 through the opening 7 to contact the flange 5 of the cylindrical portion 6 and the flange 20 of the case 11 at a countering position of cut-off portions each other. Next, on countering the cut-off portions 21 of the flange to the pawls 28 of the cap, the cap 25 being downwardly pushed, the pawls 28 pass through the cut-off portions 21, and by rotating the cap 25 the pawl 28 is engaged to the flange 5. By further rotation of the cap 25 the projection 35 guided along the guide groove 33 is engaged to the recess 34, preventing the cap from rotating, and mounting is completed.

Figure 7:
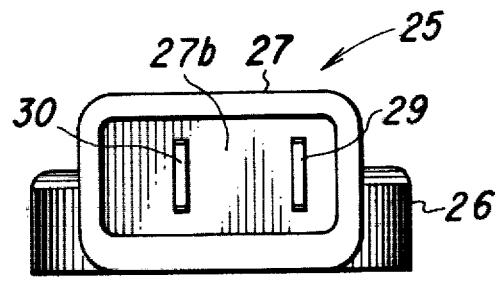
FIG. 7 is the right-hand side view of the cap shown in FIG. 6.
Figure 6:
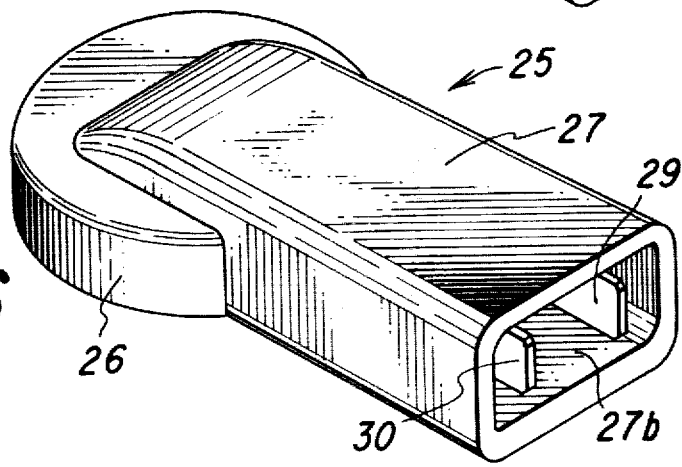
FIG. 6 is a downward diagonal view of another preferred embodiment of a cap of a level detecting device according to the present invention.

Further, in above-mentioned embodiment the terminal 29, 30 of the connector are positioned perpendicular each other, that is, crossing at right angle at their broader faces. However, they may be positioned pararell each other at their broader faces, as shown in FIG. 6. In this case, the covering portion 27 may be formed so that the terminal inserting space 27b enveloped by the covering portion 27 is shaped approximately rectangular. Further, as shown in FIG. 7, in the space 27b enveloped by the covering portion 27 the terminals 29, 30 positioned parallel may be displaced in any direction, with effect of preventing connection from an alarming device, for instance, to the connector from being mistaken, and with effect of decreasing in possible troubles in assembling, maintenance, and repairing.

Besides the above-mentioned embodiments, the present invention can be embodied by fastening the cap 25 and the flange 5 with screws. However, using a fitting means of cut-off portions and pawls, as above examples, operating efficiency of assembling is improved. And it is understood that the present invention can be applied not only to reservoirs for tandem master cylinders as in the above-mentioned embodiments, but also to reservoirs for so-called single master cylinders.

What is claimed is:

1. A level detecting device comprising:
   a detector positioned in a reservoir having an opening and for detecting the level of oil liquid in the reservoir,
   a cylindrical portion projecting from said reservoir around said opening,
   a flange projecting radially outward from the cylindrical portion, said flange having several cut-off portions,
   a cap comprising a cylindrical body having a slightly larger inner diameter than the outer diameter of the flange and a covering portion projecting laterally and integrally from said cylindrical body, said covering portion fixedly equipped with terminals connected to lead wires from the detector, the cap having the same number of pawls as the cut-off portions formed in the flange of said cap to engage said flange, said pawls projecting radially inward from the inner surface of the cylindrical body of the cap, whereby said cap is attached to the reservoir for covering the opening by rotating the cap.

2. A level detecting device according to claim 1, which further comprises means for preventing rotation of the cap at an engaged position of the pawls to the flange by rotating the cap.

3. A level detecting device according to claim 2, wherein said rotation-preventing means comprises a recess in the cap and a projection in the reservoir, the rotation of the cap being prevented by engaging of the recess and the projection.

4. A level detecting device according to claim 3, wherein said recess is provided on said covering portion.

5. A level detecting device according to any one of claims 1 to 4, wherein said terminals are fixed to the covering portion with their broader faces perpendicular to each other and disposed in a space enveloped by the covering portion.

6. A level detecting device according to any one of claims 1 to 4, wherein said terminals are fixed to the covering portion with their broader faces parallel to each other and disposed in a space enveloped by the covering portion.

7. A level detecting device according to claim 5, wherein said covering portion defines said space having a shape of an inverted T, said terminals being disposed in said space and covered with said covering portion.

8. A level detecting device according to claim 6, wherein said covering portion defines said space having a shape of a rectangle, said terminals being disposed in said space and covered with said covering portion.

9. A level detecting device according to claim 3, wherein said recess is provided on a lower surface of the covering portion and said projection is provided on a ceiling portion of the reservoir.

10. A level detecting device according to claim 9, wherein said covering portion has a guide groove on the lower surface thereof to guide said projection to said recess when said cap is rotated.

* * * * *